United States Patent
Ruth et al.

(10) Patent No.: US 11,418,337 B2
(45) Date of Patent: Aug. 16, 2022

(54) METHOD OF SECRETS INJECTION FOR AUTONOMOUS VEHICLES

(71) Applicant: GM Cruise Holdings LLC, San Francisco, CA (US)

(72) Inventors: Michael Ruth, Mountain View, CA (US); Brian Christian Nuszkowski, Ann Arbor, MI (US)

(73) Assignee: GM Cruise Holdings LLC, San Francisco, CA (US)

( * ) Notice: Subject to any disclaimer, the term of this patent is extended or adjusted under 35 U.S.C. 154(b) by 148 days.

(21) Appl. No.: 16/835,937

(22) Filed: Mar. 31, 2020

(65) Prior Publication Data
US 2021/0306141 A1    Sep. 30, 2021

(51) Int. Cl.
| H04L 9/08 | (2006.01) |
| H04L 9/32 | (2006.01) |
| H04L 9/40 | (2022.01) |
| G06F 21/44 | (2013.01) |
| G06F 21/60 | (2013.01) |
| H04W 12/04 | (2021.01) |
| H04W 4/44 | (2018.01) |
| G06F 21/31 | (2013.01) |

(52) U.S. Cl.
CPC ............. *H04L 9/088* (2013.01); *G06F 21/31* (2013.01); *H04L 9/3247* (2013.01)

(58) Field of Classification Search
CPC ..... H04L 9/088; H04L 9/3247; H04L 9/0894; H04L 9/0891; H04L 63/0823; H04L 63/062; H04L 2209/84; G06F 21/31; G06F 21/44; G06F 21/604; G06F 2221/2143; H04W 4/44; H04W 12/04
See application file for complete search history.

(56) References Cited

U.S. PATENT DOCUMENTS

| 10,501,055 | B1 * | 12/2019 | Yi | B60R 25/257 |
| 2019/0187971 | A1 * | 6/2019 | Wang | H04W 12/06 |
| 2019/0342275 | A1 * | 11/2019 | Olive | H04L 9/3247 |
| 2020/0186333 | A1 * | 6/2020 | Schubert | H04L 9/14 |
| 2020/0211301 | A1 * | 7/2020 | Zhang | H04L 63/065 |
| 2021/0167956 | A1 * | 6/2021 | Stöttinger | H04L 9/0861 |

FOREIGN PATENT DOCUMENTS

WO    2019097402 A1    5/2019

OTHER PUBLICATIONS

US 11,218,311 B2, 01/2022, Mondello (withdrawn)*
Ruth, M., et al., "Secrets Management in a Cloud Agnostic World," 10 pages (Aug. 1, 2019).

* cited by examiner

Primary Examiner — Vu V Tran

(57) ABSTRACT

Systems and methods are provided for distributing secrets and sensitive information for autonomous vehicles. In particular, systems and methods are provided for automating the acquisition of secrets and sensitive information for autonomous vehicles. Secrets, such as certificates, passwords, storage account keys, shared access signatures, encryption keys, and decryptions keys, are securely distributed to autonomous vehicles for use by various services and applications in the autonomous vehicle.

20 Claims, 9 Drawing Sheets

US 11,418,337 B2

METHOD OF SECRETS INJECTION FOR AUTONOMOUS VEHICLES

FIELD OF THE DISCLOSURE

The present disclosure relates generally to autonomous vehicles (AVs) and to systems and methods for security.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles include many services and applications that use secrets. Secrets can include certificates, passwords, storage account keys, shared access signatures, encryption keys, decryptions keys, etc. Many secrets have a limited life span and at the end of the life span, the secret expires, becomes invalid, or becomes untrusted. Thus, during operation of systems that use secrets, the secrets are regularly renewed. The secrets are generally managed by a secrets management service, which distributes the secrets.

SUMMARY

Systems and methods are provided for distributing secrets and sensitive information for autonomous vehicles. In particular, systems and methods are provided for automating the acquisition of secrets and sensitive information for autonomous vehicles. Secrets, such as certificates, passwords, storage account keys, shared access signatures, encryption keys, and decryptions keys, are securely distributed to autonomous vehicles for use by various services and applications in the autonomous vehicle.

According to one aspect, a method for injecting secrets in an autonomous vehicle includes issuing configuration parameters for acquiring a set of secrets, communicating with a secrets service to request the set of secrets, obtaining, at a secrets injection tool, the set of secrets from the secrets service, and injecting, by the secrets injection tool, secrets from the set of secrets in respective autonomous vehicle locations.

In various implementations, issuing the configuration parameters includes issuing a set of endpoints, respective ones of the set of endpoints correspond to respective secrets from the set of secrets, and respective ones of the set of endpoints indicate locations of the respective secrets within the secrets service. In some implementations, issuing the configuration parameters includes issuing a set of locations, respective ones of the set of locations correspond to respective secrets from the set of secrets, and respective ones of the set of locations indicate injection locations of the respective secrets. In some implementations, issuing configuration parameters includes issuing the configuration parameters to a secrets injection tool, and further including requesting a credential from the secrets service using the configuration parameters. In some examples, issuing configuration parameters includes issuing at least one of variable values, a DNS name, and a location of a trusted certificate authority certificate.

In various implementations, communicating includes transmitting a request for the set of secrets from the secrets injection tool to the secrets service. In some implementations, communicating includes transmitting the configuration parameters from the secrets injection tool to the secrets service. In various implementations, obtaining the set of secrets includes obtaining at least one of a certificate, a password, an encryption key, and a decryption key.

In various implementations, injecting secrets in the respective autonomous vehicle locations includes storing secrets in non-persistent memory. In some examples, the non-persistent memory expires. In some examples, expiration of the non-persistent memory occurs with an occurrent of an event, and the event includes at least one of the following: the autonomous vehicle is turned off, the autonomous vehicle is serviced, the autonomous vehicle is charged, the vehicle completes a route. In some examples, the non-persistent memory expires periodically. In one example, the non-persistent memory expires daily. In another example, the non-persistent memory expires hourly.

According to one aspect, a system for injection of secrets to an autonomous vehicle is provided. The system includes a secrets service configured to store a plurality of secrets for a fleet of vehicles including the autonomous vehicle, and a secrets injection tool in the autonomous vehicle configured to communicate with secrets service to obtain a subset of the plurality of secrets, and inject each secret of the subset in a respective autonomous vehicle location.

In various implementations, a first respective autonomous vehicle location is a non-persistent storage, and wherein a first respective secret of the subset is stored in the non-persistent storage. In various implementations, the non-persistent storage is in a first container, and wherein the first container further includes at least one application container. In some examples, the at least one application container includes an application that uses the first respective secret.

In various implementations, the system includes a set of configuration parameters provided to the secrets injection tool, wherein the configuration parameters include a set of endpoints, wherein respective ones of the set of endpoints correspond to respective secrets from the subset of secrets, and wherein respective ones of the set of endpoints indicate locations of the respective secrets within the secrets service.

In various implementations, the configuration parameters include a set of locations, the respective autonomous vehicle location corresponds to a respective secret from the subset of secrets, and the respective autonomous vehicle location indicates an injection location of the respective secret.

According to one aspect, a method of providing secrets to a set of autonomous vehicles includes issuing, to each vehicle in the set of autonomous vehicles, respective credentials for acquiring a respective set of secrets, communicating, from each vehicle in the set of autonomous vehicles, with a secrets service to request the respective set of secrets corresponding to the respective credentials, and transmitting, from the secrets service to each vehicle in the set of autonomous vehicles, the respective sets of secrets.

In various implementations, each of the respective sets of secrets is, at least in part, unique. In some examples, each respective set of secrets is different from the other sets of secrets.

In various implementations, transmitting the respective sets of secrets includes transmitting to a first vehicle in the set of autonomous vehicles a first respective set of secrets corresponding to a first respective credential, and denying the first vehicle access to secrets excluded the first respective set of secrets.

In various implementations, a issuing the respective credentials includes issuing respective sets of path endpoints, wherein respective ones of the sets of path endpoints correspond to respective secrets, and wherein respective ones of the sets of path endpoints indicate locations of the respective secrets within the secrets service.

According to one aspect, a method for operating a secrets injection tool in an autonomous vehicle includes issuing configuration parameters to the secrets injection tool for acquiring a first set of secrets, communicating with a secrets service to request the first set of secrets, obtaining the first set of secrets from the secrets service; and injecting respective secrets from the first set of secrets in respective locations in the autonomous vehicle.

In various implementations, issuing the configuration parameters includes issuing a set of endpoints, wherein respective ones of the set of endpoints correspond to respective secrets from the set of secrets, and wherein respective ones of the set of endpoints indicate locations of the respective secrets within the secrets service. In various implementations, issuing the configuration parameters includes issuing a set of locations, wherein respective ones of the set of locations correspond to respective secrets from the set of secrets, and wherein respective ones of the set of locations indicate injection locations for the respective secrets. In some implementations, injecting respective secrets includes storing respective secrets in non-persistent memory.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
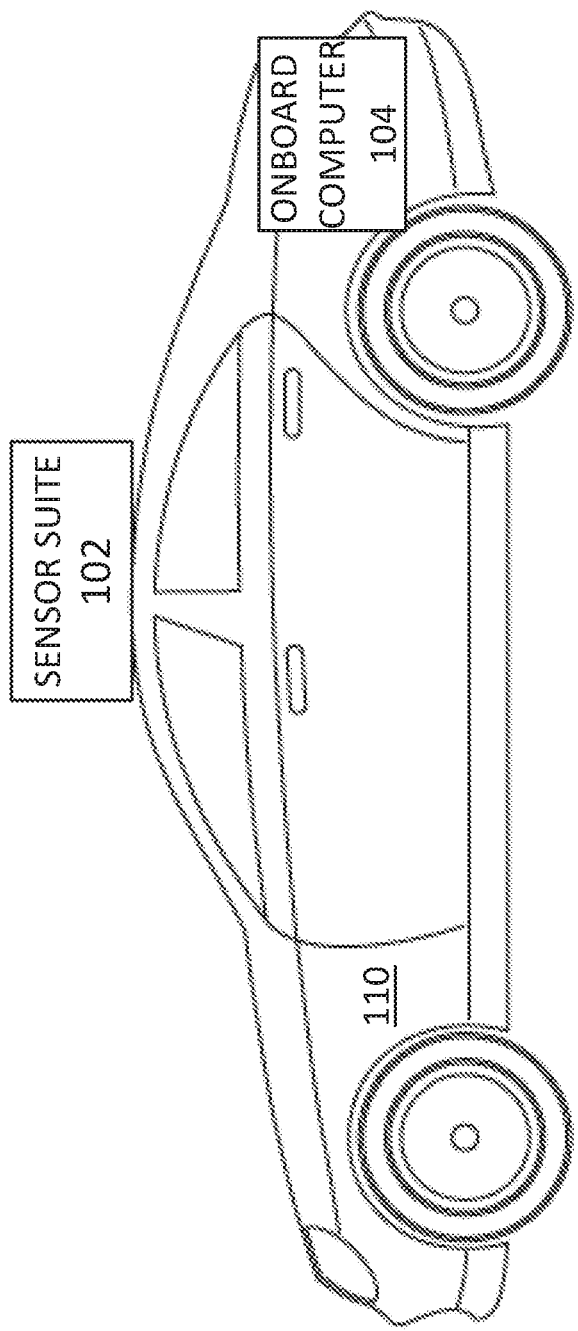
FIG. 1 is a diagram illustrating an autonomous vehicle, according to some embodiments of the disclosure.

Systems and methods are provided for distributing secrets and sensitive information for autonomous vehicles. In particular, systems and methods are provided for automating the acquisition of secrets and sensitive information for autonomous vehicles.

In general, secrets are used by many different services and applications. In some instances, applications are deployed from a single location, such as Amazon Web Services (AWS), Google Cloud Platform (GCP), Microsoft Azure, Kubernates, or Digital Ocean, or another cloud service. In these instances, the supplied cloud provider's secret manager can be used. However, when an organization has heterogenous cloud environments with a mix of deployment locations, such as the case in autonomous vehicles, a central secrets store and manager that can operate across cloud environments is needed. Such a secret manager can provide an application running in one cloud environment with access to a resource running in a different cloud environment. In various implementations, the secrets can be stored in multiple locations (with the locations depending on the application that need the secrets). However, when secrets are stored in multiple locations, the secrets manager manages the various credentials for each of the various cloud services. This adds complexity for the secrets manager of credential rotation, revocation, and varying implementations and patterns of each cloud ecosystem. Thus, when secrets are stored in multiple locations, the interoperability of having a single cloud or platform is lost.

According to some implementations, the secrets can be stored in a centralized single secrets management location, also known as a secrets service. The secrets service solves the secrets management difficulties in a cloud-agnostic way. In particular, a central secrets service allows for creation of consistent patterns for storing secrets and authenticating identities. According to various examples, the patterns remain about the same regardless of the cloud ecosystem the services are deployed into. This is accomplished by selected methods of delegating secrets paths in the central secrets store. In various examples, each autonomous vehicle in a fleet communicates with the secrets service to access secrets specific to the respective autonomous vehicle.

In some examples, a namespacing pattern for application secrets can be used to ensure that secrets management is multi-tenant and environment-aware. Secrets are not shared across environments. The patterns remain fairly consistent across cloud environments for standardizing the authentication of service identities. Authentication backends leverage authentication methods that are supported by the central secrets manager. Role bindings against the backends help ensure the central secrets manager is aware of service identities.

Secrets injection in autonomous vehicles is complicated by the many unique services and applications on each autonomous vehicle. A secrets injection tool on each autonomous vehicle acts as a secrets manager to allow applications to offload planning about how application services authenticate to the central secrets service, and how application secrets are acquired. The secrets injection tool retrieves secrets, and the secrets injection tool puts the secrets in locations the applications expect the secrets to be. Once secrets have been retrieved, the secrets manager injects the secrets into locations expected by the respective applications.

Various secrets for an autonomous vehicle can be stored in many different locations. In various implementations, the selected location for secrets storage depends on what applications and services need the secrets and where those applications and services are running. While in some examples, secrets are stored in source code or in build artifacts, source code and build artifacts may not be the most secure locations since they can potentially be accessed by users. Furthermore, source code and artifacts can be reused in multiple environments. Other locations for secrets storage are non-persistent storage locations. Non-persistent storage is storage that expires regularly, such as each time an autonomous vehicle is turned off, each time an autonomous vehicle completes a route, or at regular intervals (e.g., hourly, daily, etc.)

In various implementations, in an autonomous vehicle fleet, deployment of software onto many individual instances of vehicles is automated. Furthermore, each vehicle is programmed to enable the vehicle to access various secrets and sensitive information specific to the respective vehicle. However, according to various implementations, each vehicle receives the secrets the respective vehicle uses, and vehicles are not over-authorized. In particular, vehicles are not given access to secrets and sensitive information specific to other vehicles. Additionally, any selected vehicle includes multiple services running on the vehicle, and each service has access to a subset of the secrets the vehicle acquires, where the subset of secrets is specific to service. Not all secrets are available to each service or application running on the vehicle. Thus, according to various implementations, an autonomous vehicle is programmatically enabled access to a superset of secrets from a secrets service, wherein the superset of secrets is determined according to the autonomous vehicle and the services running on the autonomous vehicle. Subsets of the superset of secrets are granularly distributed by a secrets injection tool to individual services running on the autonomous vehicle.

Example Autonomous Vehicle Configured for Secrets Injection

FIG. 1 is a diagram 100 illustrating an autonomous vehicle 110, according to some embodiments of the disclosure. The autonomous vehicle 110 includes a sensor suite 102 and an onboard computer 104. In various examples, the onboard computer 104 includes a secrets injection tool that receives secrets and distributes the secrets to the appropriate services in the autonomous vehicle 110. In various implementations, the autonomous vehicle 110 uses sensor information from the sensor suite 102 to determine its location, to navigate traffic, and to sense and avoid various obstacles. In various examples, the sensor suite 102 includes one or more services or applications that use secrets acquired by the secrets injection tool.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view. In various examples, the onboard computer 104 includes a secrets injection tool, and the secrets injection tool communicates with a cloud-based secrets service to retrieve secrets used by the autonomous vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicles 110 and processes sensed data from the sensor suite 102 and/or other sensors in order to determine states of the autonomous vehicles. The onboard computer 104 may receive secrets injections and distribute the secrets to appropriate services. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Secrets Injection Method

Figure 2:
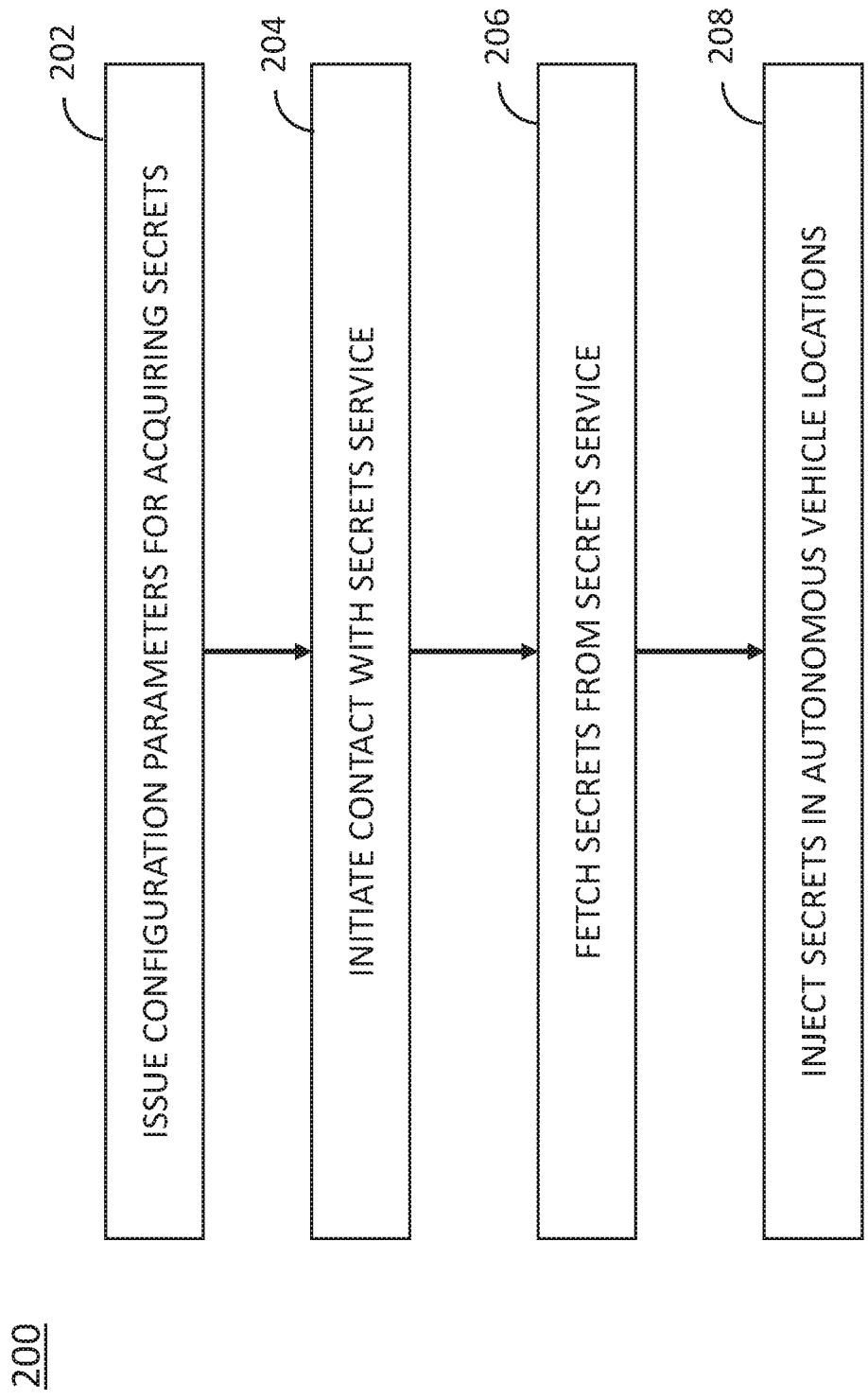
FIG. 2 is a flow chart illustrating a method for secrets injection into an autonomous vehicle, according to some embodiments of the disclosure.

FIG. 2 is a flow chart 200 illustrating a method of secrets injection for autonomous vehicles, according to various embodiments of the invention. At step 202, during the autonomous vehicle build, the build process issues configuration parameters for acquiring secrets.

During the build step 202, the source code for the autonomous vehicle is built and packaged. During the build step 202, the configuration parameters are set. The configuration parameters are used by the autonomous vehicle to acquire secrets used during operation. The configuration parameters include values for variables such as the secrets service DNS name, the location of the Certificate Authority (CA) certificate to trust, the individual endpoints where each secret is located within the secrets service, and the location on the autonomous vehicle where the secrets are injected. In various examples, during the autonomous vehicle deployment process, the configuration is provided to a given vehicle along with any binary code and/or source code used for autonomous vehicle function. The build step 202 is described in further detail with respect to FIG. 7.

At step 204, on initiation, a secrets injection tool in an autonomous vehicle starts and contacts a cloud-based AV secrets service. According to various examples, initiation may occur each time a vehicle is started, each time a vehicle is charged, or each time a vehicle returns to a service center.

At step 204, during vehicle initiation, the autonomous vehicle has acquired a credential from the secrets service. In one example, an autonomous vehicle undergoes a registration process before initiation, and the autonomous vehicle acquires the credential during one of these processes. In some examples, the configuration parameters from the build step 202 are used to acquire the credential from the secrets service. The credential is used by the secrets injection tool to authenticate the secrets service. According to various examples, initiation may occur each time a vehicle is started, each time a vehicle is serviced, or at regular intervals (for example, hourly or daily). In various examples, the credential represents the identity of the entity requesting the secret.

At step 206, the secrets injection tool fetches secrets from the AV secrets service. In particular, once the secrets service verifies the credential received from the secrets injection tool, the secrets requested by the secrets injection tool are transmitted to the secrets injection tool. In some examples, the secrets injection tool has a temporary storage location for the retrieved secrets, and processes the secrets to inject the secrets in the locations where the various services and/or applications that requested the secrets expect the secrets to be.

At step 208, the secrets injection tool injects the secrets received from the AV secrets service at various locations. In particular, secrets are injected where the internal autonomous vehicle services expect their respective secrets to reside. In some examples, secrets reside in various storage locations on the autonomous vehicle. In some examples, the secrets reside in one or more memory addresses or databases. In various examples, the secrets reside in non-persistent storage locations. Non-persistent storage is ephemeral, and expires regularly. In some examples non-persistent storage expires at initiation of a vehicle, and in some examples, non-persistent storage expires when a vehicle is turned off and/or at regular intervals (e.g., hourly, daily). Some non-persistent storage locations expire when the vehicle completes a task, such as when the vehicle completes a route. In some examples, the secrets reside at various locations in the onboard computer of the autonomous vehicle.

Example Secrets Injection Systems

Figure 3:
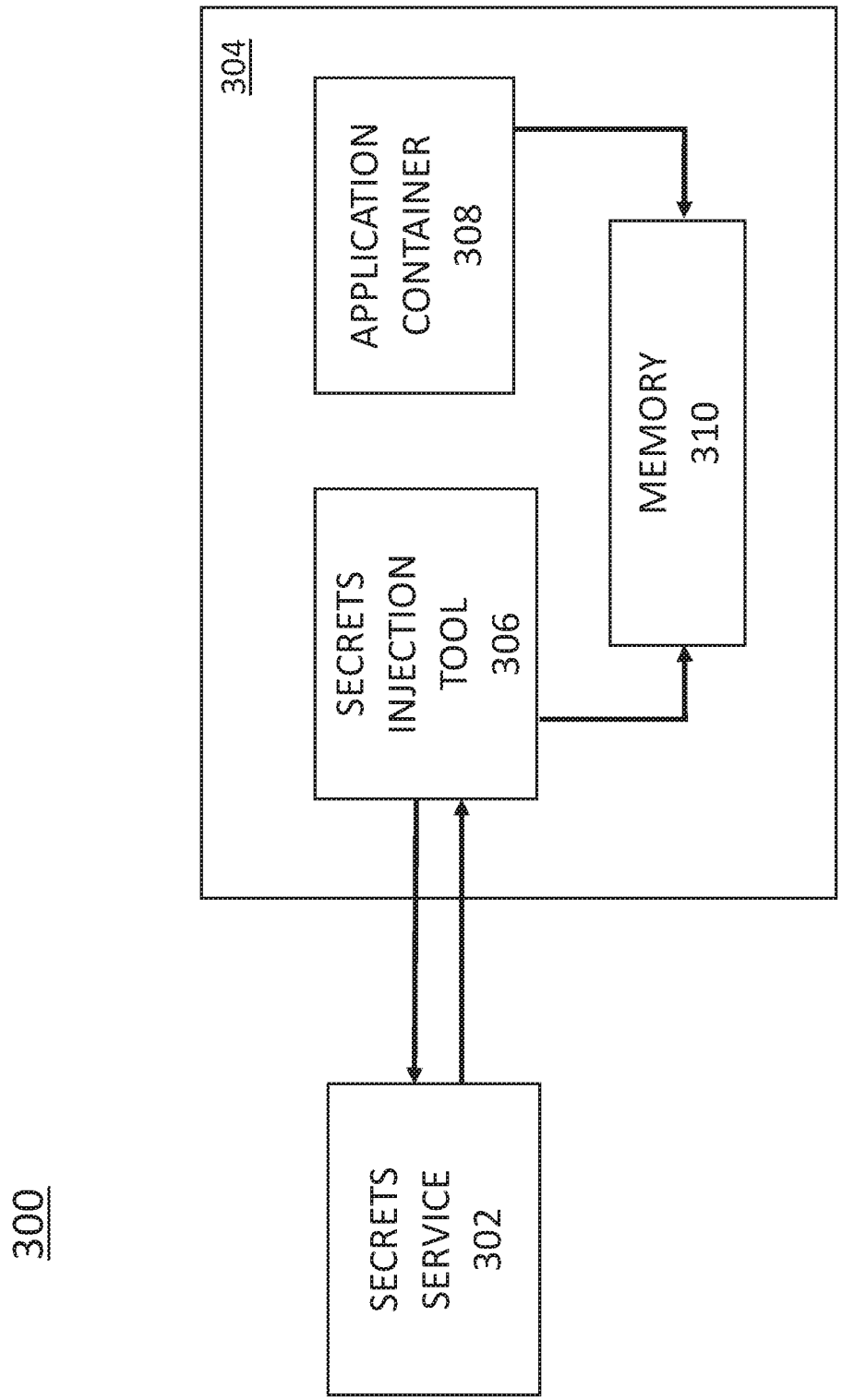
FIG. 3 is a diagram illustrating a secrets service and a container, according to some embodiments of the disclosure.

FIG. 3 is a diagram 300 illustrating a secrets service 302 and a container 304 including a secrets injection tool 306, an application container 308, and memory 310, according to various embodiments of the disclosure. As described above, the secrets injection tool 306 sends an authorization credential to the secrets service 302. The secrets service 302 transmits the authorized secrets to the secrets injection tool 306. The secrets injection tool 306 transfers one or more of the received secrets to memory 310, where one or more applications that uses the secret (in the application container 308) can retrieve the secret. According to various examples, memory 310 is the location where the application(s) in the application container 308 expects to find its secrets. In some examples, the container 304 includes multiple application containers 308.

In various implementations, the secrets service 302 is a cloud-based service. In some implementations, the secrets service 302 includes a database for storing secrets. In some implementations, the secrets service 302 includes a data storage module. The secrets service 302 accesses the database to retrieve secrets for the secrets injection tool 306. According to various implementations, the secrets service 302 and the secrets injection tool 306 transmit and receive communications wirelessly.

According to various implementations, the container 304 is in an autonomous vehicle. In some examples, the container 304 is in the onboard computer of an autonomous vehicle. During a deployment process for the autonomous vehicle, the secrets injection tool 306 is provided to the autonomous vehicle.

Figure 4:
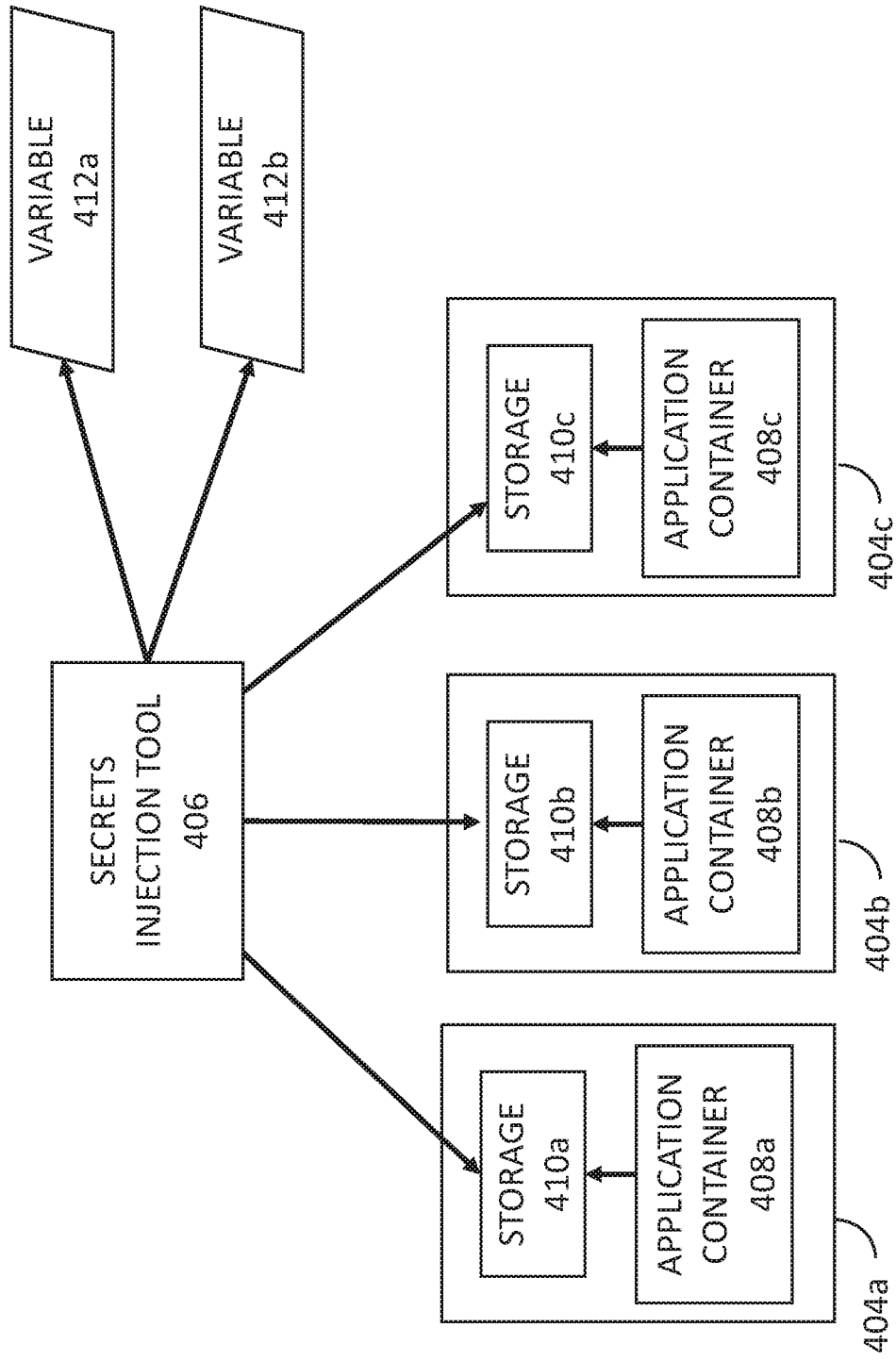
FIG. 4 is a diagram illustrating a secrets injection tool injecting secrets in memory locations, according to some embodiments of the disclosure.

FIG. 4 is a diagram illustrating a secrets injection tool 406 injecting secrets in various memory locations 410a, 410b, 401c, in containers 404a, 404b, 404c according to various implementations of the disclosure. The secrets injection tool 406 is in an autonomous vehicle, and in some examples, the secrets injection tool 406 is in the onboard computer of an autonomous vehicle. The secrets injection tool 406 is a centralized tool that injects secrets to multiple containers 404a, 404b, 404c, as well as to selected variable 412a, 412b. In various examples, the variables 412a, 412b are environmental variables. Environmental variables describe a location in memory as part of a selected process. The secrets injection tool 406 facilitates the secrets acquisition process in the autonomous vehicle. Additionally, during initialization, the secrets injection tool 406 facilitates the distribution of secrets to the locations where various services running on the vehicle expect to find the secrets.

In some implementations, during the deployment process, configuration values are distributed, and the secrets injection tool 406 uses the configuration values to determine how to acquire respective secrets. Similarly, the secrets injection tool 406 uses the configuration values to determine where to acquire respective secrets from the secrets service. In some examples, once the secrets injection tool 406 has acquired secrets, the secrets injection tool 406 distributes the secrets to one or more of the non-persistent storage locations 410a-410c and the variables 412a, 412b. The secrets injection tool 406 injects secrets in various locations, such as the storage locations 410a-410c and variables 412a-412b. In some examples, each request for a secret that the secrets injection tool 406 receives includes a respective location for injection of the requested secret. In some examples, the Autonomous Driving System Computer and any services associated with the Autonomous Driving System Computer are services and applications that use variables 412a-412b. In some examples, the Autonomous Driving System Computer and any services associated with the Autonomous Driving System Computer are services and applications that use stored secrets. In some examples, the Multi-Carrier Telematics Module and associated services are services and applications that use stored secrets.

In various examples, one or more of the secrets exist for the lifetime of the service. In some examples, one or more of the secrets exist for the period during which the vehicle is running, and the secrets expire when the vehicle is turned off. In some examples, the secrets expire at regular intervals (e.g., daily, hourly). In some examples, as shown in FIG. 4, one or more of the storage locations 410a-410c are part of a container 404a-404c, and the storage locations 410a-410c expire with the container pods 404a-404c.

Once the secrets injection tool 406 has acquired secrets, each service running on the autonomous vehicle can acquire their respective secrets. In FIG. 4, the storage location 410a is in a container 404a, which also includes an application container 408a. The application(s) in the application container 408a access the storage location 410a for secrets. Similarly, the storage location 410b is in a container 404b, which also includes an application container 408b. The application(s) in the application container 408b access the storage location 410b for secrets. The storage location 410c is in a container 404c, which also includes an application container 408c. The application(s) in the application container 408c access the storage location 410c for secrets. In some examples, one or more of the applications in application containers 408a-408c also access one or more variables 412a and 412b for secrets.

Figure 5:
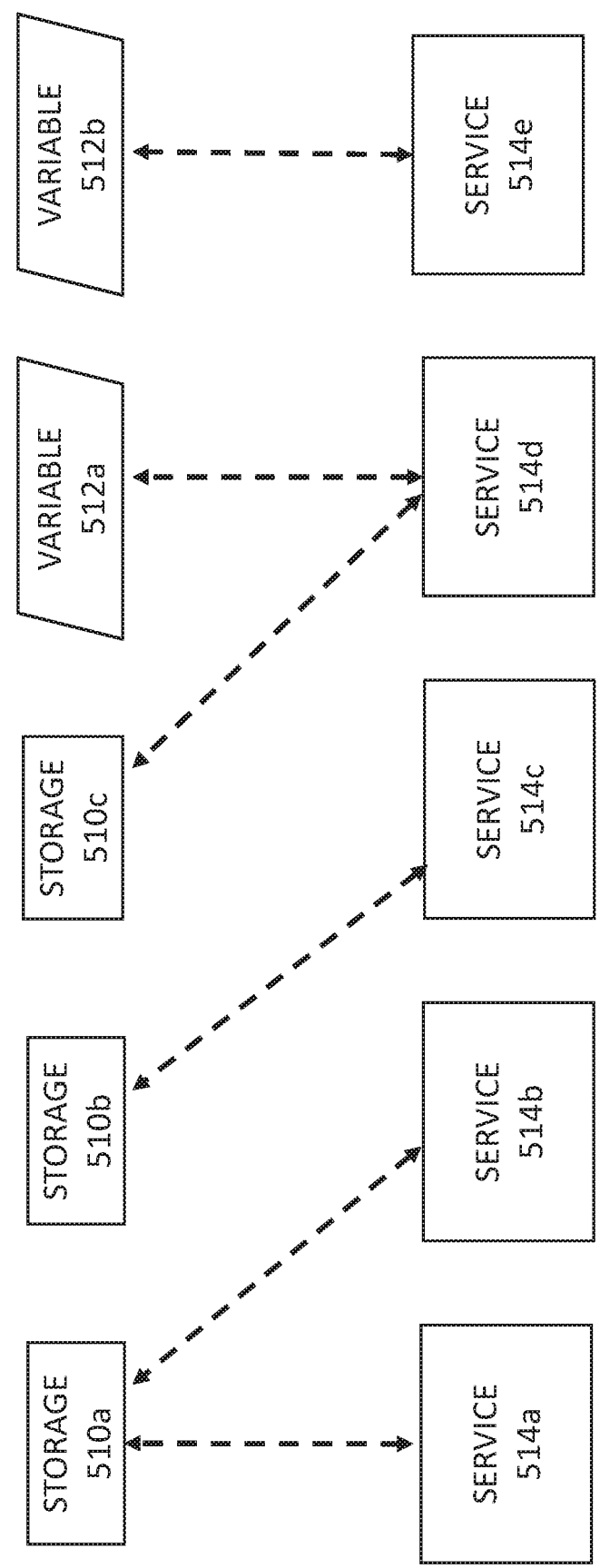
FIG. 5 is a diagram illustrating an autonomous vehicle communicating with a cloud, according to some embodiments of the disclosure.

FIG. 5 is a diagram illustrating communication between the storage locations 510a-510c, variable 512a-512b, and various services 514a-514e, according to some embodiments of the disclosure. The services 514a-514e are running on an autonomous vehicle. In some examples, the services 514a-514e are in containers. In other examples, services are not in containers and are run from other locations. The storage locations 510a-510c and the variable 512a-512b contain secrets that were injected by the secrets injection tool. Services that use the secrets, access the respective storage location 510a-510a or variable 512a-512b to retrieve respective secrets. In some examples, the storage location 510a is in a container with the first 514a and second 514b services, the storage location 510b is in a container with the third service 514c, and the storage locations 510c is in a container with the fourth service 514d. The services 514a-514e may also access storage not inside a container. In some examples, the fourth service 514d accesses the first variable 512a and the fifth service 514e accesses the second variable 512b. According to various examples, the storage locations 510a-510c are non-persistent storage. Thus, the data in the storage locations 410a-410c is only temporarily stored.

Figure 6:
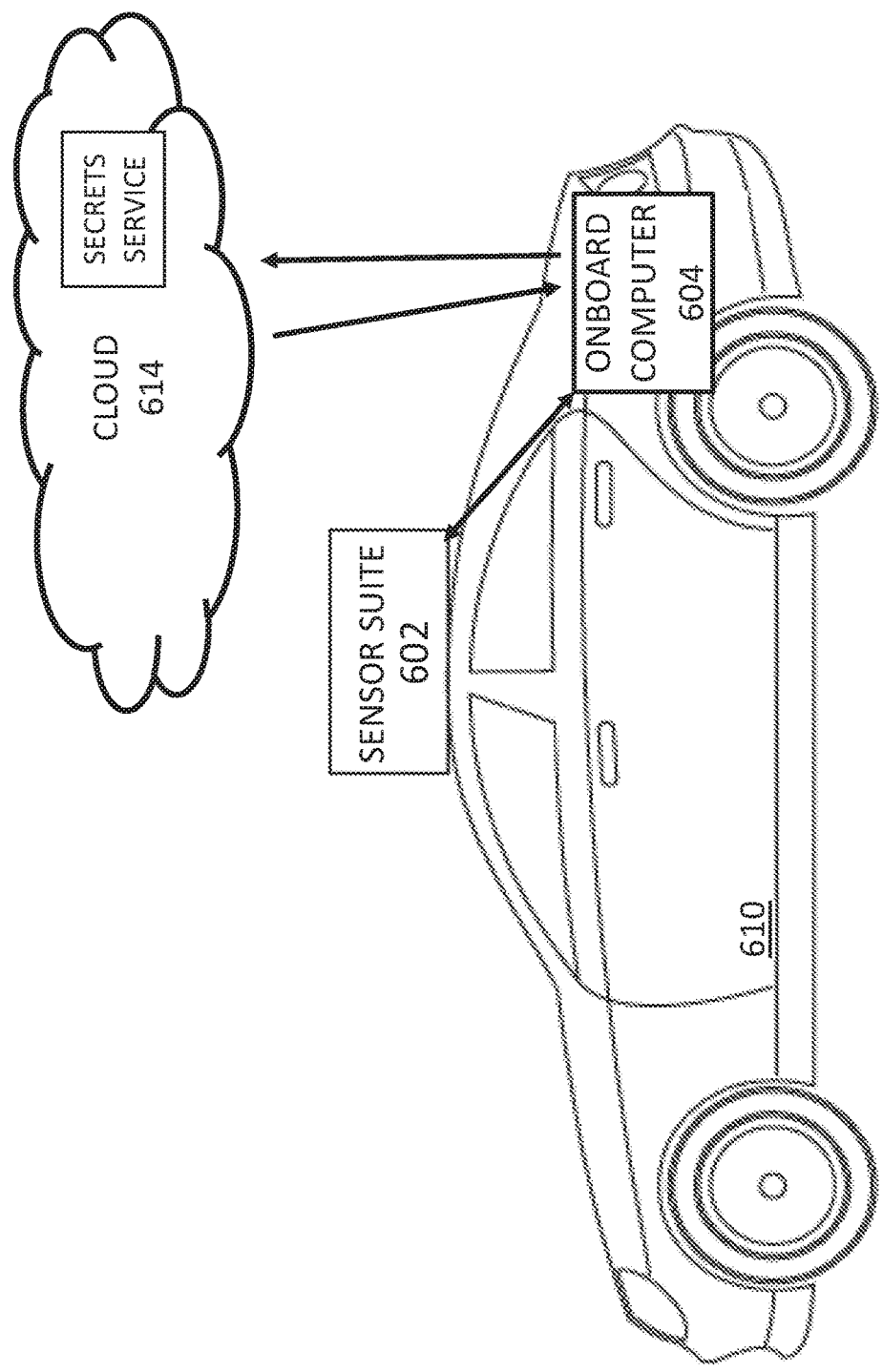
FIG. 6 is a diagram illustrating a build process and a fleet of autonomous vehicles, according to some embodiments of the disclosure.

FIG. 6 is a diagram illustrating an autonomous vehicle 610 communicating with a cloud 614, according to various implementations of the disclosure. The autonomous vehicle 610 includes an onboard computer 604, and the onboard computer 604 communicates wirelessly with the cloud 614. According to various examples, the onboard computer 604 includes a secrets injection tool, as described above. The cloud 614 includes a secrets service. The secrets injection tool communicates with the secrets service to transmit credentials, and the secrets service transmits respective secrets to the secrets injection tool. The secrets injection tool can inject received secrets to any selected location in the autonomous vehicle. In some examples, the secrets injection tool injects secrets in the sensor suite 602.

In various implementations, build configuration parameters are provided by the cloud 614 to each autonomous vehicle 610. In some examples, build configuration parameters are packaged along with a build artifact (a binary) that is used by the autonomous vehicle 610 when the autonomous vehicle 610 is first initialized. In general, build configuration parameters are provided by a build pipeline, or a set of external services in a cloud environment. The build pipeline functions to package source code and any associated dependencies into a consumable artifact that the autonomous vehicle uses for functioning. In one example, the consumable artifact is software. In one example, the consumable artifact is a binary build artifact.

According to various implementations, the build process for each autonomous vehicle is unique, and each autonomous vehicle receives different secrets, different usernames, different passwords, and different credentials. In various examples, some secrets are shared with multiple vehicles, and some secrets are unique to a particular autonomous vehicle.

Example Build Process for Autonomous Vehicle

Figure 7:
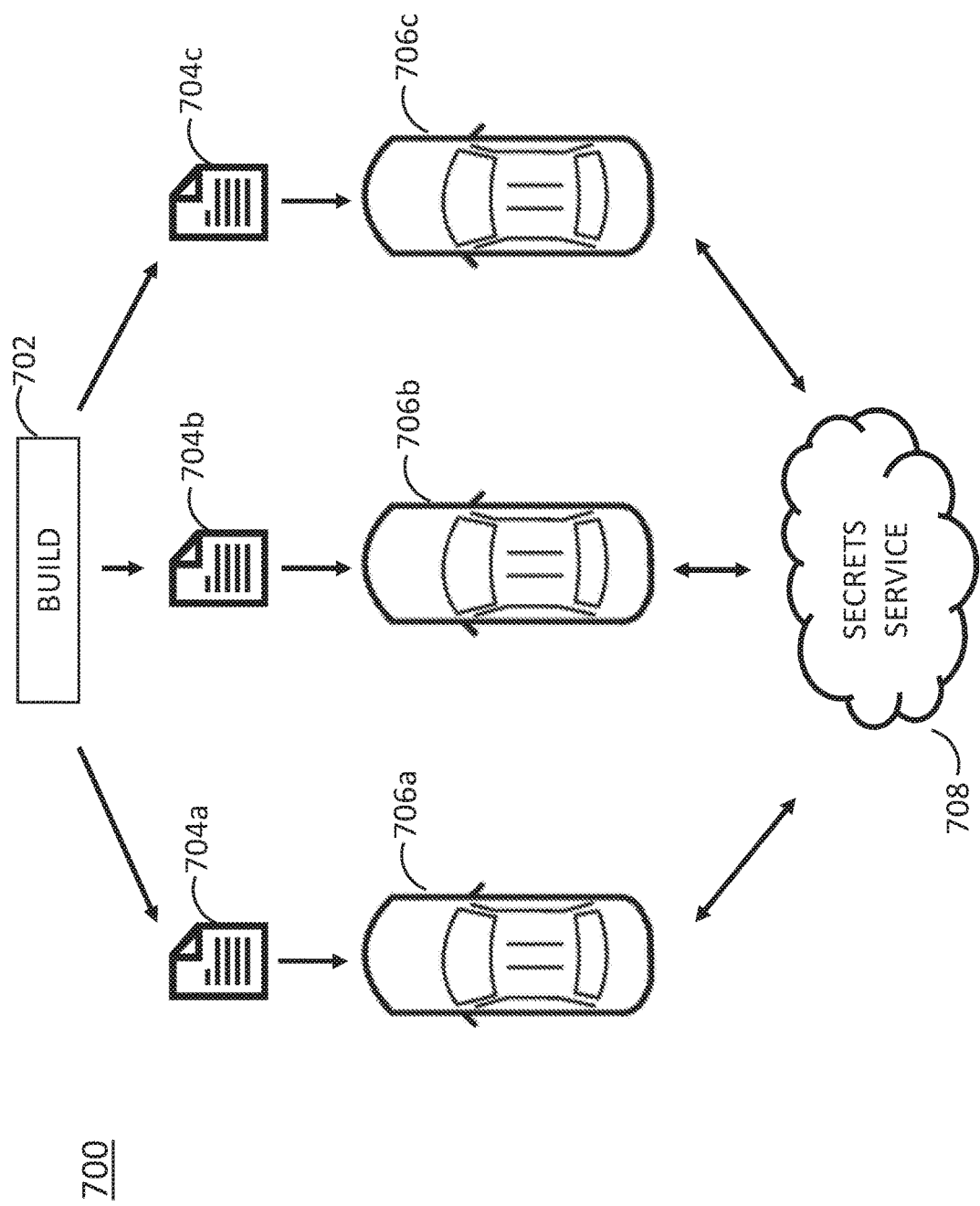
FIG. 7 is a diagram illustrating a secrets injection tool injecting secrets in various autonomous vehicle locations, according to some embodiments of the disclosure.

FIG. 7 is a diagram illustrating a build process 700, according to some embodiments of the disclosure. The build is unique for each autonomous vehicle, in that the configuration parameters are unique for each autonomous vehicle. A central build server 702 provides unique build configuration parameters 704a-704c to each autonomous vehicle 706a-706c in a fleet of autonomous vehicles. The uniqueness of the build configuration parameters 704a-704c provided to each vehicle 706a-706c makes each vehicle 706a-706c unique. Each autonomous vehicle 706a-706c uses its respective build configuration 704a-704c to acquire secrets for operation. Because each build configuration 704a-704c is unique, the set of secrets each vehicle 706a-706c requests is unique. For example, a first vehicle 704a has a first subset of secrets it can acquire from a secrets service and a second vehicle 704b has a second subset of secrets it can acquire from the secrets service. In some examples, there is some overlap between the first and second subsets of secrets. In other examples, there is no overlap between the first and second subsets of secrets. In some examples, the actual secrets in the first subset are different from the secrets in the second subset. In some examples, the types of secrets in the first subset are different from the types of secrets in the second subset.

In one example, a first vehicle 706a receives a first set of build configuration parameters 704a. The first set of configuration parameters 704a includes information regarding a path to a first secret. The path to the first secret includes where inside the secrets service 708 the secret resides, and the location in the first autonomous vehicle 706a where the secret is to be stored once acquired. Similarly, a second vehicle 706b receives a second set of build configuration parameters 704b. The second set of configuration parameters 704b is similar to the first set of configuration parameters 704a, but the second set of configuration parameters 704b includes a path to a second secret. The path to the second secret includes where inside the secrets service 708n the second secret resides, and the location in the second autonomous vehicle 706b where the secret is to be stored once acquired. Thus, when the central build server 702 provides build configuration parameters, the central build server 702 ensures that each set of build configuration parameters 704a-704c designates specific paths to specific secrets, thereby granularly providing access to the subset of secrets requested by each vehicle 706a-706c. The build server 702 does not provide access to all secrets to each vehicles 706a-706c.

The secrets service 708 includes authorization policies that determine whether a particular set of build configuration parameters 704a-704c include a credential that allow a vehicle 706a-706c access to a particular secret. When the credential is sent to the secrets service 708, the credential is authenticated by the secrets service 708 and the secrets service 708n determines if the action requested by the autonomous vehicle 706a-706c (or the secrets injection tool of the autonomous vehicle 706a-706c) is allowed. If the action is not allowed, permission is denied. If the action is permitted, and the autonomous vehicle 706a-706c can acquire the requested secret, the secrets service 708 allows the autonomous vehicle 706a-706c to fetch the secret and the autonomous vehicle 706a-706c can proliferate the retrieved secret in locations specified in its configuration parameters 704a-704c.

Example Peer-to-Peer Networks

In various implementations, autonomous vehicle service is provided as part of a peer-to-peer delivery network. Users who want to send, deliver, or move packages on demand can access a peer-to-peer delivery network and connect to an autonomous vehicle delivery service to schedule pick-up and delivery of the package.

Figure 8:
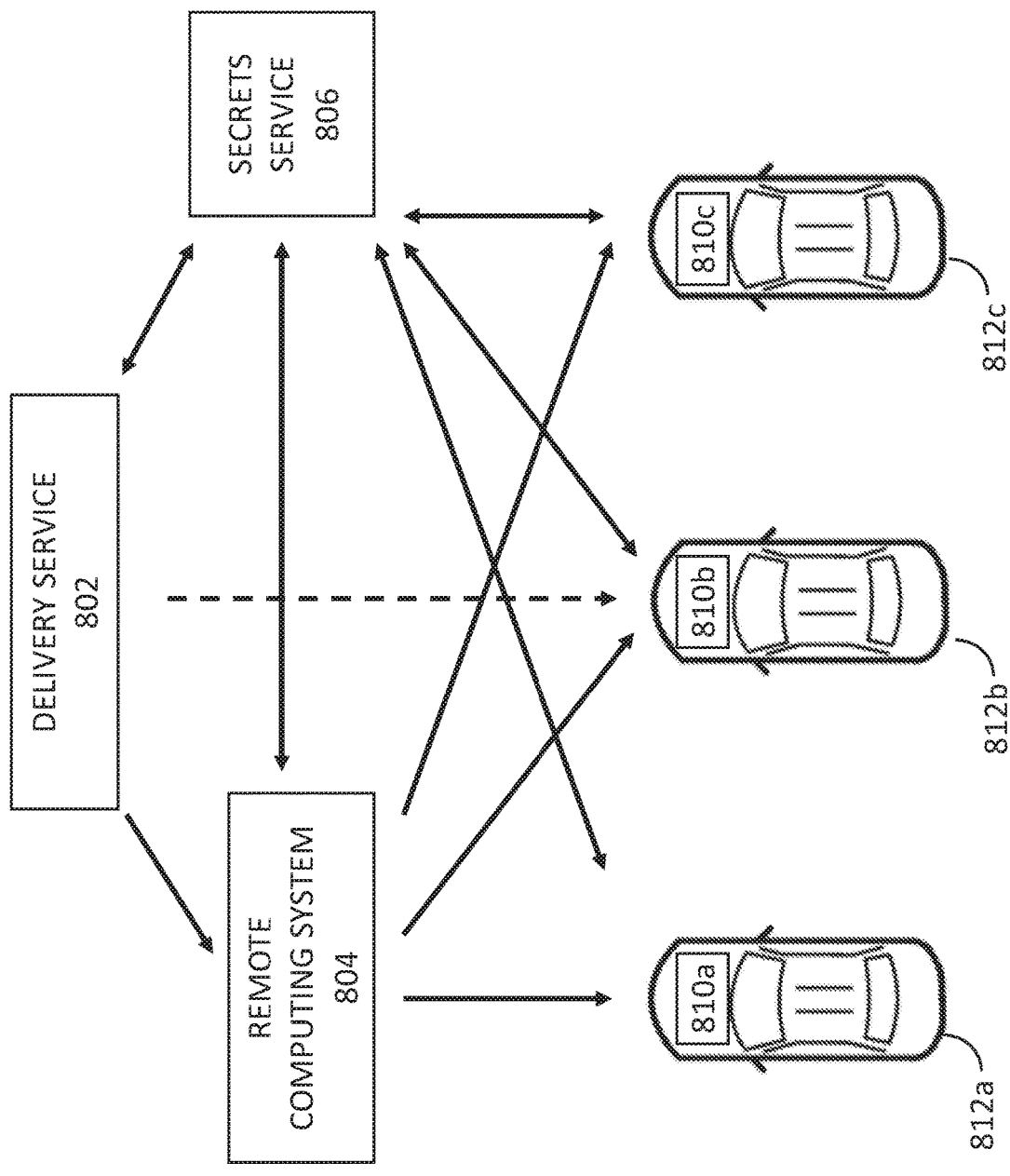
FIG. 8 is a diagram illustrating a peer-to-peer delivery system and a secrets service, according to some embodiments of the disclosure.

FIG. 8 is a diagram illustrating a peer-to-peer delivery system, according to various implementations of the disclosure. The system 800 includes a delivery service module 802, remote computing system 804, a secrets service 806, and autonomous vehicle internal computing systems 810a, 810b, 810c. The delivery service module 802 communicates a delivery request to the remote computing system 804. The delivery request identifies characteristics about the delivery, such as pick-up and delivery locations. In some examples the delivery includes packages and/or goods. In other examples, the delivery includes passengers.

The remote computing system 804 receives the delivery request from the delivery service module 802, and coordinates the selection of an autonomous vehicle 812b from a fleet of autonomous vehicles 812a-812c for pick-up and delivery. In some examples, the remote computing system 804 is a central computer, and includes a database of information from the vehicles in the autonomous vehicle fleet and a routing coordinator.

The remote computing system 804 communicates with the onboard computer 810b of a selected autonomous vehicle and provides information to allow the delivery service 802 to interface with the autonomous vehicle 812b. In various implementations, the autonomous vehicle 812b is authenticated with the delivery service 802. In some examples, configuration parameters are provided to the autonomous vehicle 812b by the remote computing system 804, to allow the autonomous vehicle 812b to interface with the delivery service 802. According to various implementations, the configuration parameters allow the autonomous vehicle 812b to acquire one or more secrets from the secrets service 806 related to the delivery request from the delivery service 802.

In some implementations, the remote computing system 804 includes a routing coordinator for planning a route for the selected autonomous vehicle, and the routing coordinator determines a route for the autonomous vehicle to travel from the autonomous vehicle's current location to the pick-up location, and from the pick-up location to the drop-off location. The remote computing system 804 sends the selected route to the autonomous vehicle. According to various implementations, the selected route is periodically updated. In some implementations, the remote computing system sends route plan information such as waypoints to the autonomous vehicle's onboard computer 810a for guiding the autonomous vehicle through an itinerary. The autonomous vehicle 812b navigates to the waypoints until it arrives at the destination (the drop-off location). In some examples, upon arrival at the drop-off location, the autonomous vehicle onboard computer 810b send an arrival message to the remote computing system 804. The remote computing system 804 sends an arrival message to the delivery service 802.

In some implementations, once the delivery arrives at the drop-off location, the autonomous vehicle 812b onboard computer 810b initiates a delivery verification system to collect evidence of delivery of the package, for example by using a camera on the autonomous vehicle 812b to take a picture of the delivery at drop-off, and/or at its delivery location. In some examples, the verification uses one or more secrets from the secrets service 806 to securely communicate the verification from the autonomous vehicle 812b to the delivery service 802.

In some implementations, the delivery service module 802 receives delivery service requests from one or more users. In some examples, the delivery service module 802 receives delivery service requests from food vendors. In some examples, the delivery service module 802 receives delivery service requests from individual users. In some examples, delivery service requests are input to the delivery service module 802 via a mobile device application or a website.

Example Computing System

Figure 9:
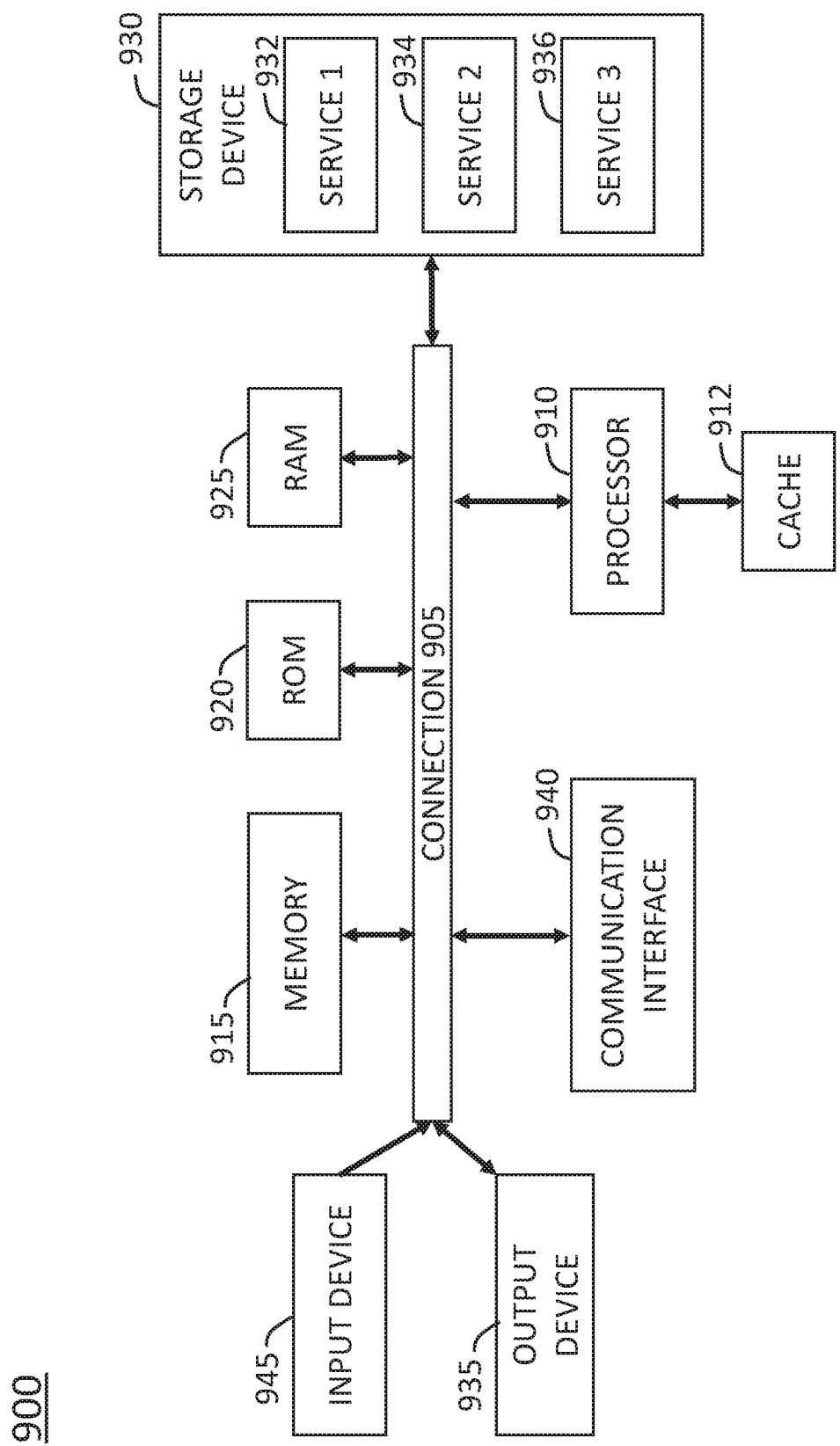
FIG. 9 shows an example embodiment of a system for implementing certain aspects of the present technology.

FIG. 9 shows an example embodiment of a computing system 900 for implementing certain aspects of the present technology. In various examples, the computing system 900 can be any computing device making up the onboard computer 104, the remote computing system 804, a device executing the delivery service 802, or any other computing system described herein. The computing system 900 can include any component of a computing system described herein which the components of the system are in communication with each other using connection 905. The connection 905 can be a physical connection via a bus, or a direct connection into processor 910, such as in a chipset architecture. The connection 905 can also be a virtual connection, networked connection, or logical connection.

In some implementations, the computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system 900 includes at least one processing unit (CPU or processor) 910 and a connection 905 that couples various system components including system memory 915, such as read-only memory (ROM) 920 and random access memory (RAM) 925 to processor 910. The computing system 900 can include a cache of high-speed memory 912 connected directly with, in close proximity to, or integrated as part of the processor 910.

The processor 910 can include any general-purpose processor and a hardware service or software service, such as services 932, 934, and 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction, the computing system 900 includes an input device 945, which can represent any number of input mechanisms, such as a microphone for speech, a touch-sensitive screen for gesture or graphical input, keyboard, mouse, motion input, speech, etc. The computing system 900 can also include an output device 935, which can be one or more of a number of output mechanisms known to those of skill in the art. In some instances, multimodal systems can enable a user to provide multiple types of input/output to communicate with the computing system 900. The computing system 900 can include a communications interface 940, which can generally govern and manage the user input and system output. There is no restriction on operating on any particular hardware arrangement, and therefore the basic features here may easily be substituted for improved hardware or firmware arrangements as they are developed.

A storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as a processor 910, a connection 905, an output device 935, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles. In some examples, an autonomous vehicle service includes service to the autonomous vehicle's secrets injection tool.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for injecting secrets in an autonomous vehicle, comprising issuing configuration parameters for acquiring a set of secrets, communicating with a secrets service to request the set of secrets, obtaining, at a secrets injection tool, the set of secrets from the secrets service, and injecting, by the secrets injection tool, secrets from the set of secrets in respective autonomous vehicle locations.

Example 2 provides a method according to example 1, wherein issuing the configuration parameters includes issuing a set of endpoints, respective ones of the set of endpoints correspond to respective secrets from the set of secrets, and respective ones of the set of endpoints indicate locations of the respective secrets within the secrets service.

Example 3 provides a method according to one or more of the preceding examples, wherein issuing the configuration parameters includes issuing a set of locations, respective ones of the set of locations correspond to respective secrets from the set of secrets, and respective ones of the set of locations indicate injection locations of the respective secrets.

Example 4 provides a method according to one or more of the preceding examples, wherein communicating includes transmitting from the secrets injection tool to the secrets service, a request for the set of secrets.

Example 5 provides a method according to one or more of the preceding examples, wherein issuing configuration parameters includes issuing the configuration parameters to a secrets injection tool, and further including requesting a credential from the secrets service using the configuration parameters.

Example, 6 provides a method according to one or more of the preceding examples, wherein communicating includes transmitting the configuration parameters from the secrets injection tool to the secrets service.

Example 7 provides a method according to one or more of the preceding examples, wherein issuing configuration parameters includes issuing at least one of variable values, a DNS name, and a location of a trusted certificate authority certificate.

Example 8 provides a method according to one or more of the preceding examples, wherein obtaining the set of secrets includes obtaining at least one of a certificate, a password, an encryption key, and a decryption key.

Example 9 provides a method according to one or more of the preceding examples, wherein injecting secrets in the respective autonomous vehicle locations includes storing secrets in non-persistent memory.

Example 10 provides a method according to one or more of the preceding examples, wherein the non-persistent memory expires, and wherein expiration of the non-persistent memory occurs with at least one of following: when the autonomous vehicle is turned off, when the autonomous vehicle is serviced, when the autonomous vehicle is charged.

Example 11 provides a system for injection of secrets to an autonomous vehicle, including a secrets service configured to store a plurality of secrets for a fleet of vehicles including the autonomous vehicle, and a secrets injection tool in the autonomous vehicle configured to communicate with secrets service to obtain a subset of the plurality of secrets, and inject each secret of the subset in a respective autonomous vehicle location.

Example 12 provides a system according to one or more of the preceding examples, wherein a first respective autonomous vehicle location is a non-persistent storage, and wherein a first respective secret of the subset is stored in the non-persistent storage.

Example 13 provides a system according to one or more of the preceding examples, wherein the non-persistent storage is in a container, and wherein the container further includes at least one application container.

Example 14 provides a system according to one or more of the preceding examples, wherein the at least one application container includes an application that uses the first respective secret.

Example 15 provides a system according to one or more of the preceding examples, including a set of configuration parameters provided to the secrets injection tool, wherein the configuration parameters include a set of endpoints, wherein respective ones of the set of endpoints correspond to respective secrets from the subset of secrets, and wherein respective ones of the set of endpoints indicate locations of the respective secrets within the secrets service.

Example 16 provides a system according to one or more of the preceding examples, wherein the configuration parameters include a set of locations, the respective autonomous vehicle location corresponds to a respective secret from the subset of secrets, and the respective autonomous vehicle location indicates an injection location of the respective secret.

Example 17 provides a method of providing secrets to a set of autonomous vehicles, including issuing, to each vehicle in the set of autonomous vehicles, respective credentials for acquiring a respective set of secrets, communicating, from each vehicle in the set of autonomous vehicles, with a secrets service to request the respective set of secrets corresponding to the respective credentials, and transmitting, from the secrets service to each vehicle in the set of autonomous vehicles, the respective sets of secrets.

Example 18 provides a method according to one or more of the preceding examples, wherein each of the respective sets of secrets is, at least in part, unique.

Example 19 provides a method according to one or more of the preceding examples, wherein each of the respective sets of secrets is, at least in part, different from other respective sets of secrets.

Example 20 provides a method according to one or more of the preceding examples, wherein transmitting the respective sets of secrets includes transmitting to a first vehicle in the set of autonomous vehicles a first respective set of secrets corresponding to a first respective credential, and denying the first vehicle access to secrets excluded the first respective set of secrets.

Example 21 provides a method according to one or more of the preceding examples, wherein issuing the respective credentials includes issuing respective sets of path endpoints, wherein respective ones of the sets of path endpoints correspond to respective secrets, and wherein respective ones of the sets of path endpoints indicate locations of the respective secrets within the secrets service.

Example 22 provides a method for operating a secrets injection tool in an autonomous vehicle, comprising issuing configuration parameters to the secrets injection tool for acquiring a first set of secrets, communicating with a secrets service to request the first set of secrets, obtaining the first set of secrets from the secrets service; and injecting respective secrets from the first set of secrets in respective locations in the autonomous vehicle.

Example 23 provides a method according to one or more of the preceding examples, wherein issuing the configuration parameters includes issuing a set of endpoints, wherein respective ones of the set of endpoints correspond to respective secrets from the set of secrets, and wherein respective ones of the set of endpoints indicate locations of the respective secrets within the secrets service.

Example 24 provides a method according to one or more of the preceding examples, wherein issuing the configuration parameters includes issuing a set of locations, wherein respective ones of the set of locations correspond to respective secrets from the set of secrets, and wherein respective ones of the set of locations indicate injection locations for the respective secrets.

Example 25 provides a method according to one or more of the preceding examples, wherein injecting respective secrets includes storing respective secrets in non-persistent memory.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for injecting secrets in an autonomous vehicle, comprising:
   issuing configuration parameters for acquiring a set of secrets to a secrets injection tool, wherein the set of secrets is determined based in part on services running on the autonomous vehicle, and wherein issuing configuration parameters includes issuing a set of endpoints,
      wherein respective ones of the set of endpoints correspond to respective secrets from the set of secrets, and
      wherein respective ones of the set of endpoints indicate locations of the respective secrets within a cloud-based secrets service;
   communicating with the cloud-based secrets service to request the set of secrets;
   requesting a credential from the cloud-based secrets service using the configuration parameters;
   obtaining, at the secrets injection tool in the autonomous vehicle, the set of secrets from the cloud-based secrets service; and
   injecting, by the secrets injection tool, secrets from the set of secrets in respective autonomous vehicle locations.

2. The method of claim 1, wherein issuing the configuration parameters includes issuing a set of locations,
   wherein respective ones of the set of locations correspond to respective secrets from the set of secrets, and
   wherein respective ones of the set of locations indicate injection locations of the respective secrets.

3. The method of claim 1, wherein communicating includes transmitting a request for the set of secrets from the secrets injection tool to the secrets service.

4. The method of claim 1, wherein communicating includes transmitting the configuration parameters from the secrets injection tool to the secrets service.

5. The method of claim 1, wherein issuing configuration parameters includes issuing at least one of variable values, a DNS name, and a location of a trusted certificate authority certificate.

6. The method of claim 1, wherein obtaining the set of secrets includes obtaining at least one of a certificate, a password, an encryption key, and a decryption key.

7. The method of claim 1, wherein injecting secrets in the respective autonomous vehicle locations includes storing secrets in at least one non-persistent memory.

8. The method of claim 7, wherein the non-persistent memory expires with an occurrence of an event, and wherein the event includes at least one of: the autonomous vehicle is turned off, the autonomous vehicle is serviced, the autonomous vehicle is charged, and the autonomous vehicle completes a route.

9. A system for injection of secrets to an autonomous vehicle, comprising:
a cloud-based secrets service configured to store a plurality of secrets for a fleet of vehicles including the autonomous vehicle;
a secrets injection tool in the autonomous vehicle configured to:
communicate with cloud-based secrets service to obtain a subset of the plurality of secrets, wherein the subset of the plurality of secrets is based in part on services running on the autonomous vehicle, and
inject each secret of the subset in a respective autonomous vehicle location; and
a set of configuration parameters provided to the secrets injection tool, wherein the configuration parameters include a set of endpoints,
wherein respective ones of the set of endpoints correspond to respective secrets from the subset of secrets, and
wherein respective ones of the set of endpoints indicate locations of the respective secrets within the cloud-based secrets service, and
wherein the secrets injection tool is to request a credential from the cloud-based secrets service using the configuration parameters.

10. The system of claim 9, wherein a first respective autonomous vehicle location is a non-persistent storage, and wherein a first respective secret of the subset is stored in the non-persistent storage.

11. The system of claim 10, wherein the non-persistent storage is in a first container, and wherein the first container further includes at least one application container.

12. The system of claim 11, wherein the at least one application container includes an application that uses the first respective secret.

13. The system of claim 9, wherein the configuration parameters include a set of locations,
wherein the respective autonomous vehicle location corresponds to a respective secret from the subset of secrets, and
wherein the respective autonomous vehicle location indicates an injection location of the respective secret.

14. The system of claim 9, wherein the secrets injection tool uses the credential to authenticate the cloud-based secrets service.

15. A method of providing secrets to a set of autonomous vehicles, comprising:
issuing, to each vehicle in the set of autonomous vehicles, respective credentials for acquiring a respective set of secrets, wherein each respective set of secrets is based in part on services running on each respective autonomous vehicle;
issuing, to each vehicle in the set of autonomous vehicles, respective configuration parameters for acquiring a respective set of secrets to a respective secrets injection tool, wherein the respective set of secrets is determined based in part on services running on the respective autonomous vehicle, and wherein issuing respective configuration parameters includes issuing respective sets of endpoints,
wherein respective ones of the respective sets of endpoints correspond to respective secrets from the respective sets of secrets, and
wherein respective ones of the respective sets of endpoints indicate locations of the respective secrets within a cloud-based secrets service;
communicating, from each vehicle in the set of autonomous vehicles, with the cloud-based secrets service to request the respective set of secrets corresponding to the respective credentials; and
transmitting, from the cloud-based secrets service to each vehicle in the set of autonomous vehicles, the respective sets of secrets.

16. The method of claim 15, wherein each of the respective sets of secrets is, at least in part, unique.

17. The method of claim 15, wherein transmitting the respective sets of secrets includes:
transmitting to a first vehicle in the set of autonomous vehicles a first respective set of secrets corresponding to a first respective credential, and
denying the first vehicle access to secrets excluded from the first respective set of secrets.

18. The method of claim 15, wherein communicating, from each vehicle in the set of autonomous vehicles, includes transmitting a respective request for the respective set of secrets from the respective secrets injection tool to the cloud-based secrets service.

19. The method of claim 15, wherein communicating, from each vehicle in the set of autonomous vehicles, includes transmitting the respective configuration parameters from the respective secrets injection tool to the cloud-based secrets service.

20. The method of claim 15, wherein issuing, to each vehicle in the set of autonomous vehicles, respective configuration parameters includes issuing, to each vehicle in the set of autonomous vehicles, at least one of variable values, a DNS name, and a location of a trusted certificate authority certificate.

* * * * *